(12) United States Patent
Minami et al.

(10) Patent No.: US 10,473,063 B2
(45) Date of Patent: *Nov. 12, 2019

(54) EGR SYSTEM FOR INTERNAL-COMBUSTION ENGINE

(71) Applicant: DENSO CORPORATION, Kariya, Aichi-pref. (JP)

(72) Inventors: Keitarou Minami, Kariya (JP); Hideaki Ichihara, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,400

(22) Filed: Apr. 23, 2018

(65) Prior Publication Data

US 2018/0238275 A1 Aug. 23, 2018

Related U.S. Application Data

(62) Division of application No. 15/300,902, filed as application No. PCT/JP2015/001769 on Mar. 27, 2015, now Pat. No. 10,107,235.

(30) Foreign Application Priority Data

Apr. 2, 2014 (JP) .................................. 2014-75938

(51) Int. Cl.
*F02M 26/06* (2016.01)
*F02D 21/08* (2006.01)
(Continued)

(52) U.S. Cl.
CPC ......... *F02M 26/06* (2016.02); *F02B 29/0443* (2013.01); *F02B 47/08* (2013.01);
(Continued)

(58) Field of Classification Search
CPC .. F02M 26/06; F02M 35/10393; F02M 26/23; F02M 26/28; F02D 21/08;
(Continued)

(56) References Cited

U.S. PATENT DOCUMENTS

| 9,828,902 B2 | 11/2017 | Uto |
| 2007/0204597 A1 | 9/2007 | Nakano |

(Continued)

FOREIGN PATENT DOCUMENTS

| EP | 2 213 859 | 8/2010 |
| GB | 2069058 | 2/1980 |

(Continued)

OTHER PUBLICATIONS

U.S. Appl. No. 15/300,902, filed Sep. 30, 2016 (29 pgs.).

*Primary Examiner* — Hoang M Nguyen
(74) *Attorney, Agent, or Firm* — Nixon & Vanderhye P.C.

(57) ABSTRACT

In an engine, an intake duct is provided with an intercooler disposed downstream of an intake air compressor. An EGR pipe is provided with an EGR valve and an EGR cooler. An ECU determines a generation of a condensed water in the EGR cooler, the generation of the condensed water in a merging portion where a fresh air and an EGR gas merge with each other, and the generation of the condensed water in the intercooler. When it is determined that the condensed water is generated in any of these portions, the ECU performs a corresponding countermeasure for restricting the generation of the condensed water.

8 Claims, 5 Drawing Sheets

(51) Int. Cl.
*F02D 23/00* (2006.01)
*F02B 29/04* (2006.01)
*F02D 41/00* (2006.01)
*F02M 26/23* (2016.01)
*F02B 47/08* (2006.01)
*F02D 41/26* (2006.01)
*F02D 41/14* (2006.01)
*F02M 35/10* (2006.01)
*F02M 26/28* (2016.01)

(52) U.S. Cl.
CPC .............. *F02D 21/08* (2013.01); *F02D 23/00* (2013.01); *F02D 41/005* (2013.01); *F02D 41/0007* (2013.01); *F02D 41/0047* (2013.01); *F02D 41/26* (2013.01); *F02M 26/23* (2016.02); *F02B 29/0493* (2013.01); *F02D 2041/1472* (2013.01); *F02M 26/28* (2016.02); *F02M 35/10393* (2013.01); *Y02T 10/144* (2013.01); *Y02T 10/146* (2013.01); *Y02T 10/47* (2013.01)

(58) Field of Classification Search
CPC .... F02D 41/005; F02D 41/26; F02D 41/0007; F02D 41/0047; F02D 23/00; F02D 2041/1472; F02B 47/08; F02B 29/0443; Y02T 10/144; Y02T 10/47; Y02T 10/146
USPC .................. 60/599, 600, 605.1, 605.2, 611
See application file for complete search history.

(56) References Cited

U.S. PATENT DOCUMENTS

| 2010/0326408 | A1 | 12/2010 | Clarke et al. |
| 2012/0090584 | A1 | 4/2012 | Jung |
| 2014/0026870 | A1 | 1/2014 | Yamada |
| 2014/0046511 | A1 | 2/2014 | Uzkan et al. |
| 2014/0283798 | A1 | 9/2014 | Shimane |
| 2015/0107566 | A1* | 4/2015 | Sugiyama ........... F02B 29/0443 123/568.12 |
| 2015/0226103 | A1 | 8/2015 | Greiner |
| 2015/0369179 | A1 | 12/2015 | Hotta |
| 2016/0265458 | A1 | 9/2016 | Okada et al. |
| 2017/0022940 | A1 | 1/2017 | Minami et al. |

FOREIGN PATENT DOCUMENTS

| JP | 8-135519 | 5/1996 |
| JP | 11-200956 | 7/1999 |
| JP | 2009-052486 | 3/2009 |
| JP | 2009-174444 | 8/2009 |
| JP | 4631886 | 2/2011 |
| JP | 2013-144934 | 7/2013 |
| JP | 2013-160180 | 8/2013 |
| JP | 2013-238201 | 11/2013 |
| JP | 5382368 | 1/2014 |

* cited by examiner

EGR SYSTEM FOR INTERNAL-COMBUSTION ENGINE

CROSS REFERENCE TO RELATED APPLICATION

This is a divisional of U.S. application Ser. No. 15/300,902, filed Sep. 30, 2016, which is the U.S. national phase of International Application No. PCT/JP2015/001769, filed Mar. 27, 2015, which designated the U.S. and claims priority to Japanese Patent Application No. 2014-75938 filed on Apr. 2, 2014, the entire disclosures of each of which are incorporated herein by reference.

TECHNICAL FIELD

The present disclosure relates to EGR systems for internal combustion engines.

BACKGROUND ART

Generally, internal combustion engines are provided with an external EGR device for recirculating a part of exhaust gas to an intake side. There has been known an EGR cooler disposed in an EGR pipe in an external EGR device to cool an EGR gas. Further, there has been generally known an intercooler disposed upstream of an intake port in an internal combustion engine equipped with a supercharger. In this case, condensed water is generated in the gas passage through which the EGR gas passes.

For example, Patent Literature 1 describes a technique of controlling the cooling performance of an EGR cooler so as to make the temperature at the outlet of the EGR cooler to be equal to or lower than a necessary temperature coincident to a saturated vapor partial pressure, in order to restrict the generation of condensed water in an intercooler.

However, in an actual EGR system, an EGR gas flows into an EGR cooler and, thereafter, until it is introduced into cylinders, condensed water may be generated at a plurality of portions.

PRIOR ART LITERATURES

Patent Literature

[Patent Literature 1]
JP H8-135519 A

SUMMARY OF INVENTION

It is an object of the present disclosure to provide an EGR system for an internal combustion engine, which is capable of restricting a generation of condensed water in a gas passage through which an EGR gas passes.

According to an aspect of the present disclosure, there is provided an EGR system for an internal combustion engine, which includes a supercharging device adapted to supply an intake air to be introduced into an internal combustion engine; an intercooler disposed downstream of an intake air compressing portion in the supercharging device and adapted to cool the intake air; an EGR pipe adapted to recirculate a part of exhaust gas discharged from the internal combustion engine, as an EGR gas, to the intake path from an exhaust path; an EGR valve disposed in the EGR pipe; and an EGR cooler disposed in the EGR pipe. The EGR system also includes a first determination portion adapted to determine whether condensed water is generated due to cooling of the EGR gas in the EGR cooler, a second determination portion adapted to determine whether condensed water is generated in a merging portion of the intake path at which fresh air and the EGR gas merge with each other, a third determination portion adapted to determine whether condensed water is generated due to cooling of the intake air in the intercooler, and a condensed-water-restricting portion adapted to restrict the generation of condensed water, according to which of the respective determination portions determine that condensed water is generated, when any of the respective determination portions determine that condensed water is generated.

In the EGR system including the supercharging device provided with the intercooler and the external EGR device provided with the EGR cooler, the EGR gas flows into the EGR pipe and passes through the EGR cooler. Thereafter, the EGR gas merges with fresh air in the merging portion of the intake path, passes through the intercooler, and then flows into the cylinders in the internal combustion engine. This case raises the concern about the generation of condensed water in each of the portions of the EGR cooler, the gas merging portion, and the intercooler, due to some reasons regarding each of the portions. For each of the portions, it is checked whether condensed water is generated, and a countermeasure for restricting the generation of condensed water is properly performed. This enables properly restricting the generation of condensed water in any of the portions of the EGR cooler, the gas merging portion, and the intercooler. This results in restriction of the generation of condensed water in the gas passage through which the EGR gas passes.

BRIEF DESCRIPTION OF DRAWINGS

The above and other objects, features, and advantages of the present disclosure will become more apparent from the following detailed description, with reference to the accompanying drawings.

EMBODIMENTS FOR CARRYING OUT INVENTION

Hereinafter, an embodiment of the present invention will be described with reference to the drawings. In the present embodiment, a multi-cylinder four-cycle gasoline engine (internal combustion engine) incorporated in a vehicle is subjected to control, and various actuators in this engine are electronically controlled. The entire general structure of an engine control system will be described with reference to FIG. 1.

Figure 1:
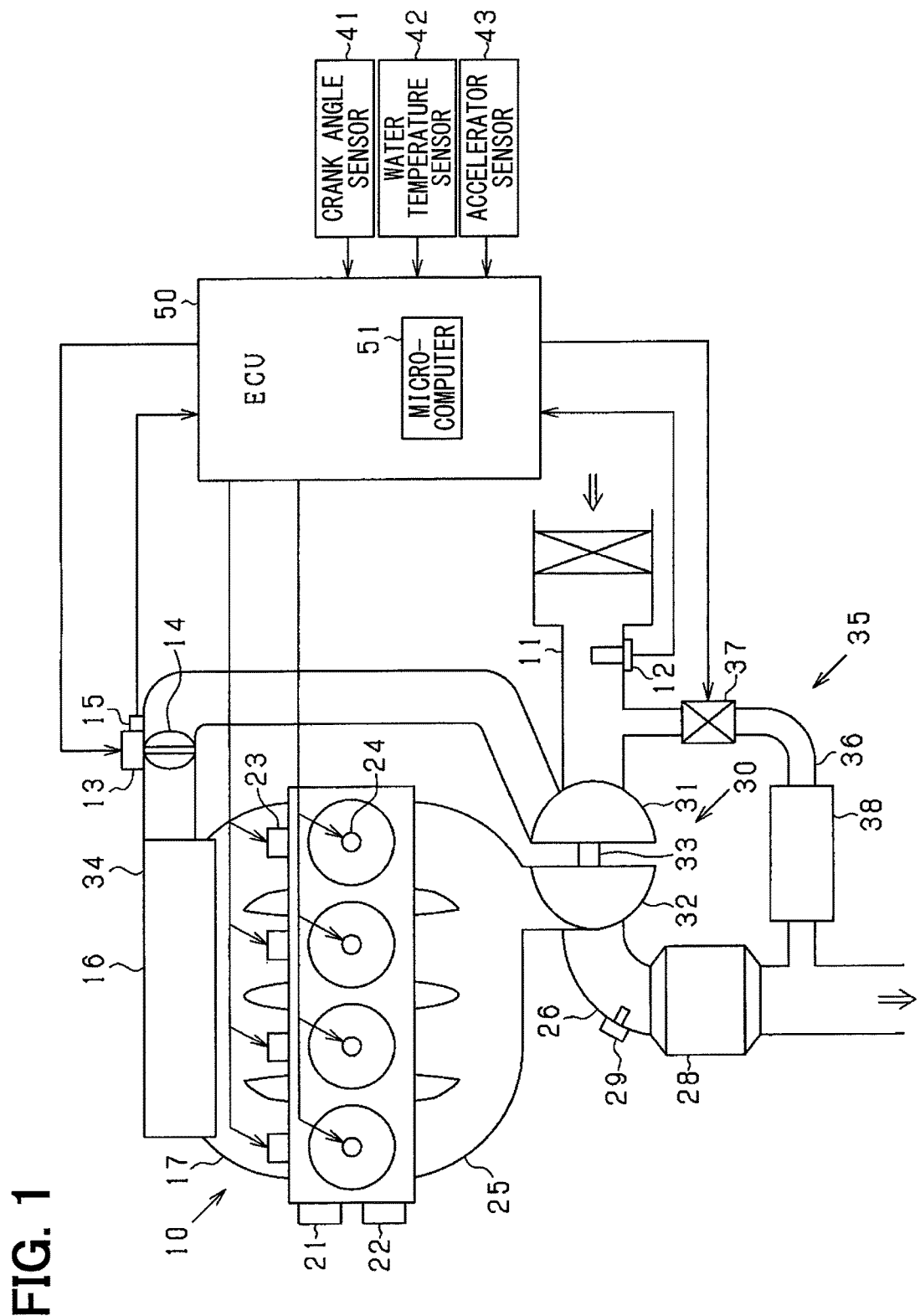
FIG. 1 is a structural view illustrating the general outline of an engine control system according to an embodiment of the invention.

In an engine 10 illustrated in FIG. 1, an air flow meter 12 is disposed upstream of an intake duct 11 to detect the amount of intake air. A throttle valve 14 is disposed downstream of the air flow meter 12 and is adjusted in terms of the degree of opening by a throttle actuator 13 such as a DC motor. The degree of opening (the degree of throttle opening) of the throttle valve 14 is detected by a throttle opening sensor 15 incorporated in the throttle actuator 13. A surge tank 16 is disposed downstream of the throttle valve 14, and an intake manifold 17 communicating with intake ports in respective cylinders is mounted to the surge tank 16. The intake duct 11 and the intake manifold 17 form an intake path.

The engine 10 has an intake port and an exhaust port which are provided with an intake valve and an exhaust valve (both of which are not illustrated), respectively. The engine 10 is provided with an intake-side valve mechanism 21 for changing timings of opening and closing the intake valve, and an exhaust-side valve mechanism 22 for changing timings of opening and closing the exhaust valve. Further, the engine 10 is provided with fuel injection valves 23 and ignition plugs 24 for the respective cylinders.

An exhaust manifold 25 is coupled to the exhaust port in the engine 10, and an exhaust duct 26 is coupled to a collector of the exhaust manifold 25. The exhaust duct 26 is provided with a catalyst 28 for cleaning up harmful components in the exhaust gas.

In the present embodiment, the catalyst 28 is constituted of a three-way catalyst for cleaning up three components, that is, CO, HC, and NOx. An air-fuel ratio sensor 29 is disposed upstream of the catalyst 28 to detect an air-fuel ratio (an oxygen concentration) of an air-fuel mixture with the exhaust gas subjected to detection. The exhaust manifold 25 and the exhaust duct 26 form an exhaust path.

A turbocharger 30 is disposed as a supercharging portion between the intake duct 11 and the exhaust duct 26. The turbocharger 30 includes an intake air compressor 31 disposed upstream of the throttle valve 14 in the intake duct 11, an exhaust gas turbine 32 disposed upstream of the catalyst 28 in the exhaust duct 26, and a rotating shaft 33 which couples the intake air compressor 31 and the exhaust gas turbine 32 to each other. The intake air compressor 31 corresponds to an intake air compressing portion. In the turbocharger 30, if the exhaust gas turbine 32 is rotated by exhaust gas flowing through the exhaust duct 26, the intake air compressor 31 is rotated along with the rotation of the exhaust gas turbine 32, so that the intake air is compressed by the rotation of the intake air compressor 31 and is supplied to be used for supercharging.

In the intake duct 11, further, an intercooler 34 is disposed, as a heat exchanger, downstream of the throttle valve 14 (downstream of the intake air compressor 31) to cool the intake air supplied to be used for supercharging. The intake air is cooled by the intercooler 34, which restricts reduction in air charging efficiency. The intercooler 34 is, for example, a water-cooled heat exchanger that causes coolant to flow therethrough, thereby performing heat exchange between the coolant and the intake air. In the present embodiment, the intercooler 34 is provided integrally with the surge tank 16; however, the intercooler 34 may be also disposed upstream of the surge tank 16 or upstream of the throttle valve 14.

The engine 10 is also provided with an external EGR device 35 for introducing a part of the exhaust gas, as an EGR gas, into the intake side. The EGR device 35 includes an EGR pipe 36 that couples the intake duct 11 and the exhaust duct 26 to each other, an electromagnetically driven EGR valve 37 that adjusts the amount of the EGR gas flowing through the EGR pipe 36, and an EGR cooler 38 that cools the EGR gas.

For example, the EGR cooler 38 is, for example, a water-cooled type heat exchanger that causes coolant to flow therethrough, thereby performing heat exchange between the coolant and the EGR gas. The EGR pipe 36 is disposed to couple a portion of the exhaust duct 26 downstream of the exhaust gas turbine 32 (e.g., downstream of the catalyst 28) to a portion of the intake duct 11 upstream of the intake air compressor 31, thereby constituting an EGR system of an low pressure loop (LPL) type.

In addition, this system is provided with various sensors such as a crank angle sensor 41 that outputs a crank angle signal for each predetermined crank angle of the engine 10, a water temperature sensor 42 that detects the temperature of the coolant in the engine 10, and an accelerator sensor 43 that detects the amount of manipulation of an accelerator by a driver.

The ECU 50 mainly includes a microcomputer 51 constituted of a CPU, a ROM, a RAM, and the like as is well known and executes various types of control programs stored in the ROM to perform various types of controls on the engine 10. More specifically, the microcomputer 51 receives detection signals and the like from the aforementioned various sensors and controls driving of the throttle valve 14, the valve mechanisms 21 and 22, the fuel injection valves 23, the ignition plugs 24, the EGR valve 37, and the like, based on the received detection signals and the like.

The ECU 50 calculates a target value of the amount of the EGR gas or the EGR rate, based on running-state parameters such as the engine speed or the load (e.g., the required amount of air). Further, the ECU 50 controls the degree of opening of the EGR valve 37, in such a way as to attain the target value.

Figure 2:
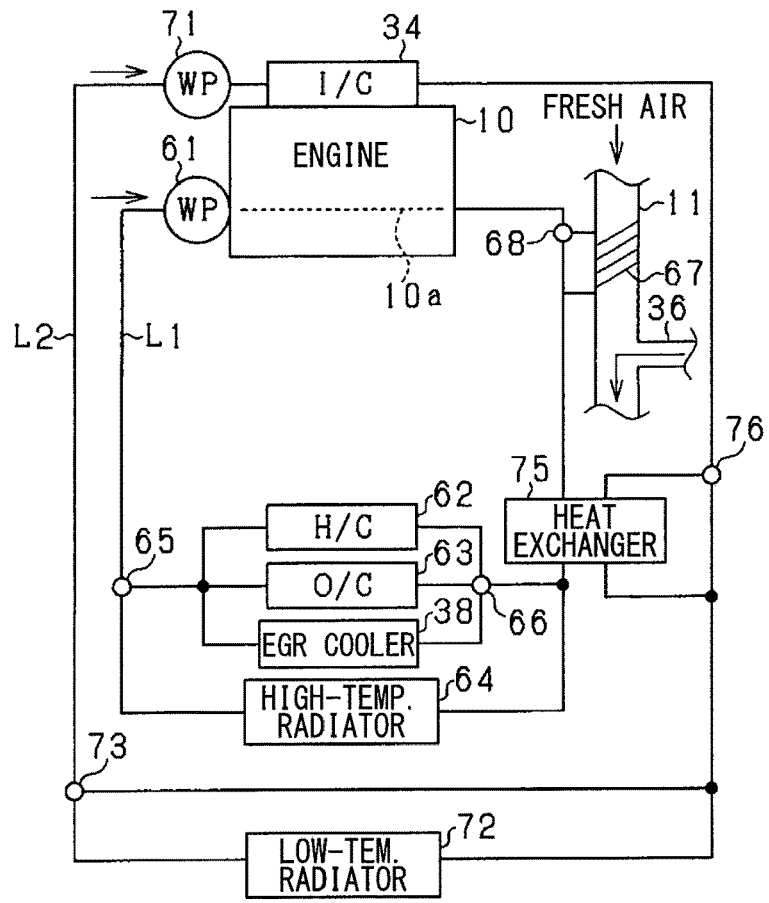
FIG. 2 is a view illustrating the general outline of a cooling system.

Next, a cooling system according to the present embodiment will be described. FIG. 2 is a view illustrating the general outline of the cooling system.

The cooling system in FIG. 2 is provided with an engine coolant passage L1 as a coolant passage communicating with a water jacket 10*a* in the engine 10, and an I/C coolant passage L2 as a coolant passage communicating with the intercooler 34, as passages for circulating the coolant. The engine coolant flowing through the engine coolant passage L1 plays a role in maintaining a state where the engine 10 is warmed while playing a role in restricting excessive temperature rise in the engine 10. Therefore, the temperature of the engine coolant is higher than that of the I/C coolant flowing through the I/C coolant passage L2. Therefore, the engine coolant passage L1 forms a high temperature passage while the I/C coolant passage L2 forms a low temperature passage.

The structure of the engine coolant passage L1 will be described. The engine coolant passage L1 is provided with an electric water pump 61, and the engine coolant is circulated through the engine coolant passage L1 by driving the water pump 61. The engine coolant passage L1 includes a passage passing through the EGR cooler 38, a heater core 62, and an oil cooler 63 which are disposed in parallel, and a passage passing through a radiator 64. The respective passages (the passages passing and not passing through the radiator 64) are provided in parallel, and a thermostat 65 determines which passages the engine coolant passes through. Since the thermostat 65 switches between the passages, the temperature of the engine coolant circulating through the engine coolant passage L1 is maintained at a predetermined high temperature value (about 80° C.).

The engine coolant passage L1 is provided with a flow rate control valve 66 at a branch portion at which the engine coolant passage L1 branches into the EGR cooler 38, the heater core 62, and the oil cooler 63. The flow rate control valve 66 adjusts the amount of the engine coolant flowing into the EGR cooler 38.

The engine coolant passage L1 is also provided with an intake duct heating device 67 disposed near the outlet of the engine 10. The intake duct heating device 67 is disposed upstream of the merging portion at which the intake duct 11 merges with the EGR pipe 36 (the gas merging portion "A") in the intake duct 11. The intake duct heating device 67 heats the duct wall portion of the intake duct 11 through heat of the engine coolant, thereby raising the temperature of the fresh air. In the engine coolant passage L1, a flow path changeover valve 68 switches between passing and not-passing of the engine coolant through the intake duct heating device 67.

The I/C coolant passage L2 is also provided with an electric water pump 71, and the I/C coolant is circulated through the I/C coolant passage L2 by driving the water pump 71. The I/C coolant passage L2 includes a passage which passes through a radiator 72, and a passage which does not pass through the radiator 72, and a thermostat 73 determines which passages the I/C coolant passes through. Since the thermostat 73 switches between the passages, the temperature of the I/C coolant circulating through the I/C coolant passage L2 is maintained at a predetermined low temperature value (about 40° C.).

Further, a heat exchanger 75 is disposed upstream of the EGR cooler 38 in the engine coolant passage L1 to perform heat exchange between the engine coolant flowing through the engine coolant passage L1 and the I/C coolant flowing through the I/C coolant passage L2. In this case, the engine coolant at a relatively high temperature flows through the engine coolant passage L1, and the I/C coolant at a relatively low temperature flows through the I/C coolant passage L2. Therefore, the heat exchanger 75 heats the I/C coolant through the engine coolant and dissipates heat from the engine coolant through the I/C coolant. The I/C coolant passage L2 is provided with a flow rate control valve 76, at a branch portion at which the I/C coolant passage L2 branches into a passage which passes through the heat exchanger 75 and a passage which does not pass through the heat exchanger 75. The flow rate control valve 76 adjusts the flow rate of the I/C coolant passing through the heat exchanger 75.

Figure 3:
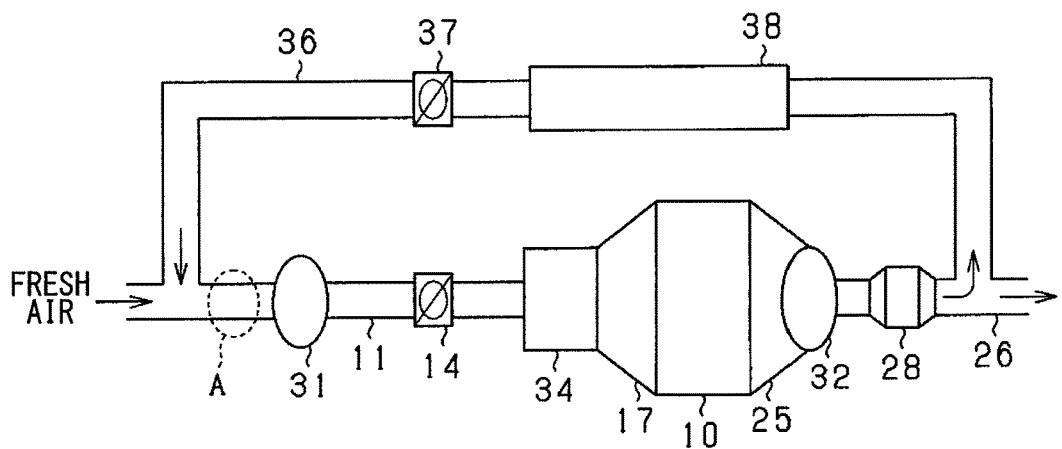
FIG. 3 is a view schematically illustrating a structure relating to an EGR gas passage.

The engine system including the external EGR device 35 as described above has a possibility of generation of condensed water at respective portions in the EGR gas passage through which the EGR gas passes. This will be described in detail with reference to FIG. 3. FIG. 3 schematically illustrates the structure relating to the EGR gas passage in the engine 10.

Referring to FIG. 3, the exhaust gas discharged from the respective cylinders in the engine 10 flows through the exhaust manifold 25, the exhaust gas turbine 32, and the catalyst 28, and a part of the exhaust gas is introduced as the EGR gas into the EGR pipe 36. Further, the EGR gas flows into the intake duct 11 through the EGR cooler 38 and the EGR valve 37 and merges with fresh air in the intake duct 11. Thereafter, the mixed gas of the EGR gas and the fresh air is introduced into the respective cylinders in the engine 10 again through the intake air compressor 31, the intercooler 34, and the intake manifold 17.

In the series of the EGR gas passages described above, the temperature of the EGR gas and the dew point temperature are changed due to several causes. Further, if the temperature of the EGR gas falls below the dew point temperature determined at each portion, condensed water is generated. The dew point temperature is determined by the temperature and the humidity at each portion. Hereinafter, a specific description will be given of the change of the state of the EGR gas in the EGR gas passage disposed downstream of the EGR cooler 38. In the EGR cooler 38, the EGR gas at a high temperature is cooled by the engine coolant. In this case, a degree of cooling the EGR gas depends on the temperature of the engine coolant. For example, before the completion of warming of the engine 10, the engine coolant is at a lower temperature and, therefore, the EGR gas is also in a low temperature state. In the intake duct 11, at the merging portion where the intake duct 11 merges with the EGR pipe 36 (the gas merging portion "A" in FIG. 3), the EGR gas is cooled by the fresh air. Further, it is considered that, at the gas merging portion "A", humidity may be raised in the EGR pipe 36 disposed upstream of the gas merging portion "A". On the downstream of the intake air compressor 31, the mixed gas of the EGR gas and the fresh air is raised in temperature due to the pressure rise along with the supercharging. In the intercooler 34, the mixed gas of the EGR gas and the fresh air is cooled by the I/C coolant.

In the passage from the EGR cooler 38 to the intercooler 34, there is a difference in dew point temperature between the portion from the EGR cooler 38 to the gas merging portion "A" and the portion from the gas merging portion "A" to the intercooler 34, due to the difference in humidity, and the like. For example, it is considered that the dew point temperature in the portion from the EGR cooler 38 to the gas merging portion "A" is higher than that in the portion from the gas merging portion "A" to the intercooler 34. Further, in the passage from the EGR cooler 38 to the intercooler 34, induced heat dissipation occurs from the pipe wall surfaces of the pipe portions (i.e., the EGR pipe 36 and the intake duct 11). Therefore, the EGR gas is gradually lowered in temperature, due to heat dissipation from the pipes.

It is expected that, in each of the portions of the EGR cooler 38, the gas merging portion "A", and the intercooler 34, the gas temperature is decreased to be equal to or lower than the dew point temperature, which raises the concern about the generation of condensed water due to the decrease of the gas temperature. Therefore, in the present embodiment, it is determined, through expectation, whether condensed water is generated at each of the aforementioned portions. If it is determined that condensed water is generated, processing of taking a countermeasure against condensed water is performed according to each portion where condensed water is generated.

The determination of the generation of condensed water is performed for each of the aforementioned portions. In this case, the ECU 50 calculates the gas temperature and the dew point temperature at each of the portions of the EGR cooler 38, the gas merging portion "A", and the intercooler 34. Further, the ECU 50 determines whether condensed water is generated, based on the comparison between the gas temperature and the dew point temperature at each of these portions. Further, if the gas temperature is lower than the dew point temperature, the ECU 50 determines that condensed water is generated.

More specifically, a temperature sensor is provided in each of the portions of the EGR cooler 38, the gas merging portion "A", and the intercooler 34, and the gas temperature in each of the portions is calculated based on the result of the detection by the temperature sensor. Further, a humidity sensor is provided in each of these portions, and the dew point temperature in each of the portions is calculated based on the detected temperature value and the detected humidity value.

Further, the gas temperature and the dew point temperature in each portion are changed depending on the engine running state and also are changed due to the pressure change and the like in each portion. Therefore, the gas temperature and the dew point temperature can be also estimated based on various parameters indicating the engine running state and state change parameters specified for each portion. In this case, it is possible to employ parameters such as the engine speed, the engine load, the degree of opening of the EGR, the engine coolant temperature. The estimation of the temperature can be performed using a formula, a map and the like which have been preliminarily specified.

The determination of the generation of condensed water can be also performed by other methods than the comparison between the gas temperature and the dew point temperature. For example, the water vapor partial pressure and the saturated water vapor pressure in each portion are calculated, and it is determined whether condensed water is generated, based on the comparison between the water vapor partial pressure and the saturated water vapor pressure. Also, the amount of water vapor and the amount of saturated water vapor in each portion are calculated, and it is determined whether condensed water is generated, based on the comparison between the amount of water vapor and the amount of saturated water vapor. The water vapor partial pressure and the saturated water vapor pressure, and the amount of water vapor and the amount of saturated water vapor can be calculated based on the temperature and the humidity. Further, in consideration of the fact that the water vapor partial pressure and the saturated water vapor pressure, and the amount of water vapor and the amount of saturated water vapor are changed depending on the engine running state, it is possible to estimate them based on various parameters indicating the engine running state.

Next, a description will be given of countermeasures against condensed water in each portion.

At first, as a countermeasure against condensed water in the EGR cooler 38, the exhaust gas recirculation itself is stopped. More specifically, the EGR valve 37 is fully closed to stop the exhaust gas recirculation itself.

As a countermeasure against condensed water in the gas merging portion "A", it is contrived to adjust the temperature of the EGR gas or the fresh air before they merge with each other in the gas merging portion "A". In this case, in order to maintain the EGR gas flowing into the gas merging portion "A" (i.e., the EGR gas after having passed through the EGR cooler) at a high temperature state, the degree of gas cooling by the EGR cooler 38 is reduced. More specifically, through the flow rate control valve 66 in FIG. 2, the amount of the coolant flowing into the EGR cooler 38 (the amount of inflow of the coolant) is reduced to attain a predetermined small flow rate thereof. It is also possible to reduce the amount of driving of the water pump 61 (i.e., the amount of discharge of the coolant therefrom), in order to reduce the amount of the coolant flowing into the EGR cooler 38 (the amount of inflow of the coolant).

Further, as a countermeasure against condensed water in the gas merging portion "A", the fresh air is heated, in order to raise the temperature of the fresh air flowing into the gas merging portion "A". More specifically, in the structure of FIG. 2, through the flow path changeover valve 68, the coolant flowing through the engine coolant passage L1 is caused to flow through the intake duct heating device 67, in order to raise the temperature of the fresh air through the engine coolant.

As a countermeasure against condensed water in the intercooler 34, the I/C coolant flowing into the intercooler 34 is raised in temperature, in order to cause the intake air to be cooled to a reduced degree in the intercooler 34. More specifically, in the structure of FIG. 2, through the flow rate control valve 76, both the engine coolant and the I/C coolant are caused to flow into the heat exchanger 75, in order to heat the I/C coolant at a lower temperature by the engine coolant at a higher temperature. In this case, the I/C coolant is raised in temperature, within a temperature range lower than the engine coolant temperature, such that the engine coolant temperature is the upper limit thereof.

Figure 4:
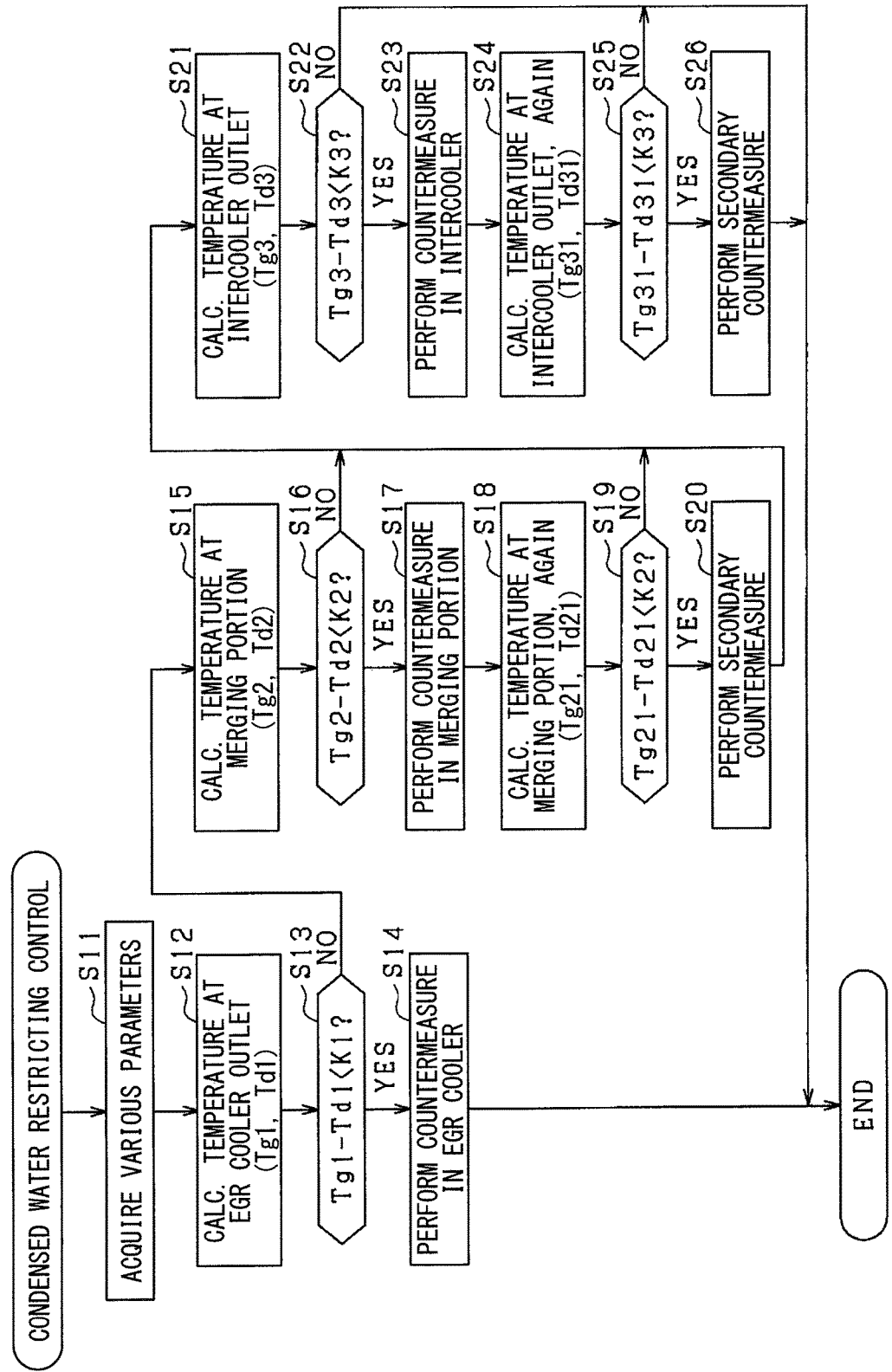
FIG. 4 is a flowchart illustrating the procedure of processing for control for restricting condensed water.

Next, a description will be given of control for restricting the generation of condensed water, which is executed by the microcomputer 51 in the ECU 50. FIG. 4 is a flowchart illustrating the procedure of processing for control for restricting the generation of condensed water. The processing is repeatedly executed at a predetermined time cycle by the microcomputer 51.

Referring to FIG. 4, in step S11, various parameters for use in the processing are acquired. In step S12, next, the gas temperature $Tg1$ and the dew point temperature $Td1$ at an outlet portion of the EGR cooler 38 are calculated. In the present embodiment, the gas temperature $Tg1$ and the dew point temperature $Td1$ in step S12 and the gas temperature and the dew point temperature in each portion which will be described later are calculated, based on the values detected by the temperature sensor and the humidity sensor.

Thereafter, in step S13, it is determined whether "$Tg1-Td1$" is less than a predetermined determination value $K1$, that is, whether condensed water may be generated in the EGR cooler 38. The determination value $K1$ is a temperature value of 0° C. or approximately 0° C. If $Tg1-Td1<K1$ is satisfied, the processing proceeds to step S14. In step S14, a countermeasure against condensed water in the EGR cooler 38 is performed. More specifically, the exhaust gas recirculation is stopped. For example, when the engine 10 is in a cold state, the engine coolant is at a low temperature and, thus, the EGR gas is at a low temperature. Under this condition, the countermeasure against condensed water in the EGR cooler 38 is performed. Thereafter, the present processing ends. In step S13, if $Tg1-Td1 \geq K1$ is satisfied, the processing proceeds to step S15.

In step S15, the gas temperature $Tg2$ and the dew point temperature $Td2$ at the gas merging portion "A" are calculated. In step S16, it is determined whether "$Tg2-Td2$" is less than a predetermined determination value $K2$, that is, whether condensed water may be generated in the gas merging portion "A". The determination value $K2$ is a temperature value of 0° C. or approximately 0° C. and may be the same value as the determination value $K1$. If $Tg2-Td2<K2$ is satisfied, the processing proceeds to step S17. In step S17, a countermeasure against condensed water in the gas merging portion "A" is performed. More specifically, through the control of the flow rate control valve 66 or the water pump 61, the flow rate of the engine coolant for the EGR cooler 38 is restricted. Also, through the control of the flow path changeover valve 68, the fresh air is raised in temperature by the engine coolant in the intake duct heating device 67. For example, in an environment where the outside air is at a low temperature, the fresh air at a low temperature lowers the temperature of the intake air (the mixed gas). Under this condition, the countermeasure against condensed water in the gas merging portion "A" is performed.

In steps S18 to S20, under the condition where the countermeasure against condensed water in step S17 (the primary countermeasure) is performed, it is determined again whether condensed water is generated under the current condition. Specifically, in step S18, under the condition where the primary countermeasure is performed, the gas temperature and the dew point temperature in the gas merging portion "A" are calculated again, as $Tg21$ and $Td21$. In step S19, it is determined whether "$Tg21-Td21$" is less than the determination value $K2$, that is, whether condensed water may be generated in the gas merging portion A. If $Tg21-Td21<K2$ is satisfied, the processing proceeds to step S20. In step S20, EGR reducing processing of reducing the EGR rate is performed, as a secondary countermeasure against condensed water in the gas merging portion "A". More specifically, for example, the amount of reduction of exhaust gas recirculation is calculated based on the value of "$Tg21-Td21$" and, further, the target EGR rate is corrected so as to be reduced, based on the amount of reduction of exhaust gas recirculation. Thus, as countermeasures against condensed water in the gas merging portion "A", the primary countermeasure and the secondary countermeasure are performed concurrently.

If step S19 results in YES, the EGR reduction can be also performed, by reducing the target EGR rate in stepwise manner by a predetermined value, until step S19 results in NO. The amount of reduction of exhaust gas recirculation can be also calculated based on parameters indicating the running state of the engine 10.

Under the condition where the primary countermeasure for the gas merging portion "A" is performed, it is preferable that the respective determinations in steps S16 and S19 (i.e., the determination as to whether the primary countermeasure is required, and the determination as to whether the secondary countermeasure is required) are both performed. In this case, if step S16 results in NO in the primary countermeasure, the primary countermeasure is stopped at this time point. Further, if step S19 results in YES in the primary countermeasure, the secondary countermeasure is performed in addition to the primary countermeasure. Thereafter, if step S19 results in NO, the secondary countermeasure is stopped. Then, if step S16 results in NO, the primary countermeasure is stopped.

If $Tg2-Td2 \geq K2$ is satisfied in step S16, the processing directly proceeds from step S16 to step S21 without performing steps S17 to S20. Further, if $Tg21-Td21 \geq K2$ is satisfied in step S19 and after step S20 is performed, the processing proceeds to step S21.

In step S21, the gas temperature $Tg3$ and the dew point temperature $Td3$ at the outlet portion of the intercooler 34 are calculated. In step S22, it is determined whether "$Tg3-Td3$" is less than a predetermined determination value $K3$, that is, whether condensed water may be generated in the intercooler 34. If $Tg3-Td3<K3$ is satisfied, the processing proceeds to step S23. In step S23, a countermeasure against condensed water in the intercooler 34 is performed. More specifically, through the control of the flow rate control valve 76, the heat exchanger 75 is caused to perform heat exchange, thereby raising the temperature of the I/C coolant. For example, in an environment where there is a higher humidity in the intercooler 34, the dew point temperature rises. Under this condition, the countermeasure against condensed water in the intercooler 34 is performed.

Thereafter, in steps S24 to S26, under the condition where the countermeasure against condensed water in step S23 (the primary countermeasure) is performed, it is determined again whether condensed water is generated. Specifically, in step S24, under the condition where the primary countermeasure is performed, the gas temperature and the dew point temperature at the outlet portion of the intercooler 34 are calculated again as $Tg31$ and $Td31$. In step S25, it is determined whether "$Tg31-Td31$" is less than the determination value $K3$, that is, whether condensed water may be generated in the intercooler 34. If $Tg31-Td31<K3$ is satisfied, the processing proceeds to step S26. In step S26, EGR reducing processing of reducing the EGR rate is performed as a secondary countermeasure for restricting condensed water in the intercooler 34. More specifically, for example, the amount of reduction of exhaust gas recirculation is calculated based on the value of "$Tg31-Td31$", and the target EGR rate is corrected so as to be reduced, based on the amount of reduction of exhaust gas recirculation. Thus, as countermeasures against condensed water in the intercooler 34, the primary countermeasure and the secondary countermeasure are performed concurrently.

If step S25 results in YES, the EGR reduction can be also performed, by reducing the target EGR rate in a stepwise manner by a predetermined value, until step S25 results in NO. The amount of reduction of exhaust gas recirculation can be also calculated based on parameters indicating the running state of the engine 10. In view of restricting knocking in the engine 10, it is not desirable to excessively raise the temperature of the VC coolant in the intercooler 34. If the limit of the gas temperature rise is exceeded, the amount of exhaust gas recirculation is restricted.

Under the condition where the primary countermeasure for the intercooler 34 is performed, it is preferable that the respective determinations in steps S22 and S25 (i.e., the determination as to whether the primary countermeasure is required and the determination as to whether the secondary countermeasure is required) are both performed. In this case, if step S22 results in NO in the primary countermeasure, the primary countermeasure is stopped at this time point. If step S25 results in YES in the primary countermeasure, the secondary countermeasure is performed in addition to the primary countermeasure. Thereafter, if step S25 results in NO, the secondary countermeasure is stopped. Then, if step S22 results in NO, the primary countermeasure is stopped.

If $Tg3-Td3 \geq K3$ is satisfied in step S22, the present processing temporarily ends without performing steps S23 to S26. If $Tg31-Td31 \geq K3$ is satisfied in step S25 and after step S26 is performed, the present processing temporarily ends.

According to the present embodiment which has been described in detail above, it is possible to provide excellent advantages as follows.

It is determined whether condensed water is generated in each of the portions of the EGR cooler 38, the gas merging portion "A", and the intercooler 34. If it is determined that condensed water is generated in any of the portions, the corresponding countermeasure for restricting the generation of condensed water is performed. This enables properly restricting the generation of condensed water in any of the portions of the EGR cooler 38, the gas merging portion "A", and the intercooler 34. This results in restriction of the generation of condensed water in each of the portions where condensed water may be generated in the gas passage through which the EGR gas passes, which can prevent the occurrence of corrosion and the like in the engine 10 and other products.

If it is determined that condensed water is generated in the EGR cooler 38, the exhaust gas recirculation is stopped as a countermeasure against condensed water in the EGR cooler 38, while other countermeasures against condensed water (countermeasures against condensed water in the gas merging portion "A" and the intercooler 34) are not performed. Further, if it is not determined that condensed water is generated in the EGR cooler 38, based on the results of determinations of generation of condensed water in the gas merging portion "A" and the intercooler 34, the countermeasures against condensed water in one or both of them are performed. In the EGR gas passage, the EGR cooler 38 becomes a cause of generation of condensed water, at the most upstream portion. By stopping the exhaust gas recirculation as a countermeasure against condensed water in the EGR cooler 38, it is possible to restrict the generation of condensed water in the entire passage including the portion downstream of the EGR cooler 38. In the state where the countermeasure against condensed water in the EGR cooler 38 is performed, the countermeasures against condensed water in the other portions are not performed. This can restrict the running of the engine 10 from being influenced by excessive countermeasures against condensed water.

If it is determined that the generation of condensed water in the gas merging portion "A" and the intercooler 34 cannot be prevented even when the countermeasures (the primary countermeasures) against condensed water are performed, the processing of reducing the amount of the EGR gas (the EGR rate) is performed. This enables restricting the generation of condensed water more properly.

As a countermeasure against condensed water in the gas merging portion "A", the processing of reducing the degree of cooling of the EGR gas in the EGR cooler 38 or the processing of raising the temperature of the fresh air is performed. In this case, by making the gas temperature of the mixed gas of the fresh air and the EGR gas higher than the dew point temperature in the gas merging portion "A", it is possible to properly restrict the generation of condensed water.

As a countermeasure against condensed water in the intercooler 34, the degree of cooling the intake air in the intercooler 34 is reduced. In this case, by making the temperature of the intake air (the mixed gas) higher than the dew point temperature in the intercooler 34, it is possible to properly restrict the generation of condensed water.

More specifically, the I/C coolant is raised in temperature within a range which prevents the temperature of the I/C coolant from being higher than that of the engine coolant. In this case, the I/C coolant flowing through the I/C coolant passage L2 is at a lower temperature than that of the engine coolant flowing through the engine coolant passage L1. Therefore, even when the I/C coolant is raised in temperature as a countermeasure against condensed water, the I/C coolant is maintained at a lower temperature than that of the engine coolant. Accordingly, even in the state where the intake air temperature is raised as a countermeasure against condensed water, the occurrence of knocking in the engine 10 can be restricted.

OTHER EMBODIMENTS

The aforementioned embodiment can be also modified as follows, for example.

Hereinafter, a description will be given of a different structure for processing for control for restricting the generation of condensed water. In this case, a description will be given of a structure including a determination portion that determines whether condensed water is generated in the EGR cooler 38 using the engine coolant temperature as a determination parameter, a determination portion that determines whether condensed water is generated in the gas merging portion "A" using the outside air temperature as a determination parameter, and a determination portion that determines whether condensed water is generated in the intercooler 34 using the humidity downstream of the intake air compressor 31 as a determination parameter.

In the water-cooled type EGR cooler 38, the gas temperature in the EGR cooler 38 depends on the engine coolant temperature. Therefore, before the completion of warming of the engine 10, the gas temperature in the EGR cooler 38 is relatively low. After the completion of warming of the engine 10, the gas temperature in the EGR cooler 38 is relatively high. Therefore, before the completion of warming of the engine 10, there is a higher possibility of generation of condensed water in the EGR cooler 38 than that after the completion of warming of the engine 10. More specifically, assuming that the EGR gas has a dew point of about 50° C., if the engine coolant temperature is equal to or lower than 50° C. in an engine cold state, it is determined that there is a possibility of generation of condensed water. After the engine coolant temperature has been raised to a predetermined value of 50° C.+α along with the warming thereof, it is determined that there is no possibility of generation of condensed water.

Further, the gas temperature in the gas merging portion "A" depends on the temperature of the fresh air (i.e., the outside air temperature). Therefore, if the outside air temperature (e.g., the value detected by an outside air temperature sensor or by a intake air temperature sensor at an upstream portion of the intake path) is equal to or lower than a predetermined value, it is deemed that the gas temperature in the gas merging portion "A" falls within a predetermined low temperature range, and it is determined that there is a possibility of generation of condensed water in the gas merging portion "A".

The dew point temperature in the intercooler 34 depends on the humidity downstream of the intake air compressor 31. Therefore, if the humidity downstream of the compressor is equal to or more than a predetermined value, it is deemed that the dew point temperature in the intercooler 34 falls within a predetermined high temperature range (a temperature range which tends to induce condensed water), and it is determined that there is a possibility of generation of condensed water in the intercooler 34. The humidity downstream of the compressor can be determined from the result of detection by a humidity sensor provided at an upstream portion of the intake path or near the intake air compressor, for example.

Figure 5:
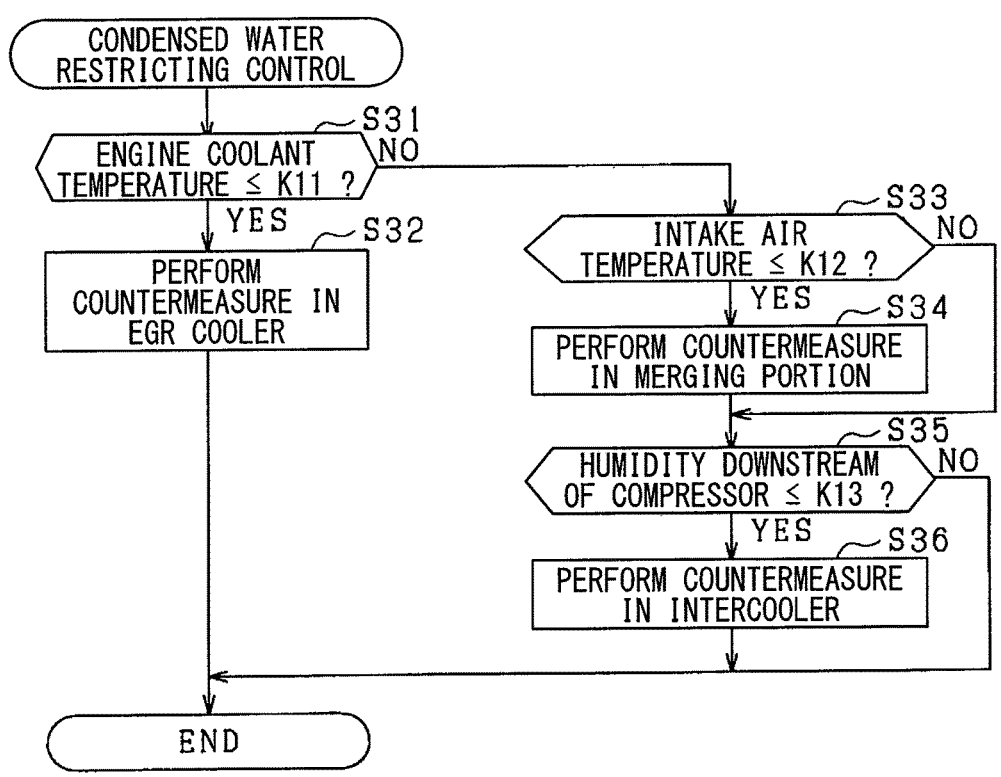
FIG. 5 is a flowchart illustrating the procedure of processing for control for restricting condensed water.

A description will be given of processing for control for restricting the generation of condensed water according to the present embodiment, with reference to a flowchart in FIG. 5. The processing in FIG. 5 is executed by the microcomputer 51, instead of the processing in FIG. 4. Referring to FIG. 5, in step S31, it is determined whether the engine coolant temperature is equal to or lower than a predetermined value K11 (e.g., 50° C.), and if this determination results in YES, the processing proceeds to step S32. In step S32, a countermeasure against condensed water in the EGR cooler 38 is performed (similarly to step S14 in FIG. 4).

Further, if step S31 results in NO, the processing proceeds to step S33. In step S33, it is determined whether the outside air temperature is equal to or lower than a predetermined value K12 (e.g., 0° C.), and if this determination results in YES, the processing proceeds to step S34. In step S34, a countermeasure against condensed water in the gas merging portion "A" is performed (similarly to step S17 in FIG. 4).

Further, after step S34 is performed or if step S33 results in NO, the processing proceeds to step S35. In step S35, it is determined whether the humidity downstream of the intake air compressor 31 is equal to or higher than a predetermined value K13 and if this determination results in YES, the processing proceeds to step S36. In step S36, a countermeasure against condensed water in the intercooler 34 is performed (similarly to step S23 in FIG. 4).

The aforementioned structure is adapted to perform the determination of the generation of condensed water in the EGR cooler 38, the determination of the generation of condensed water in the gas merging portion "A", and the determination of the generation of condensed water in the intercooler 34, using the respective different references. This enables properly performing the determination of generation of condensed water in each of the portions, according to the circumstance in each of the portions.

Figure 6:
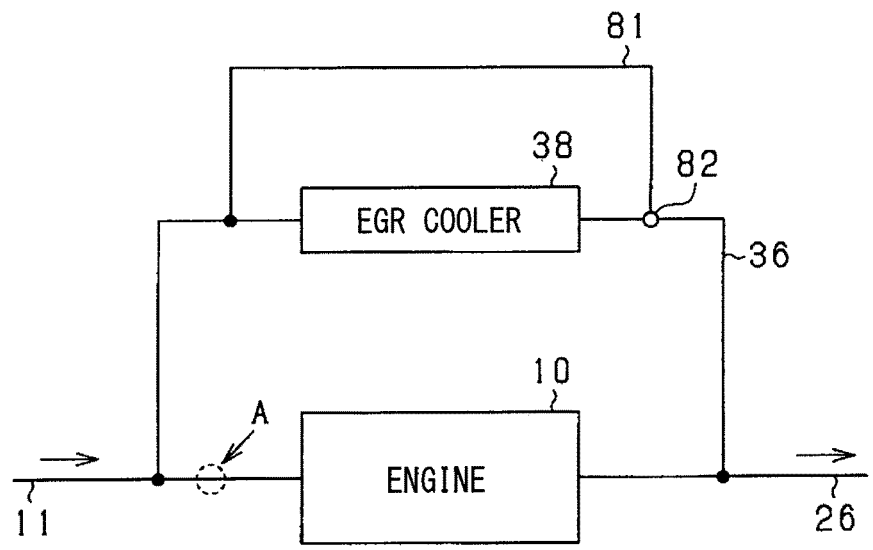
FIG. 6 is a view schematically illustrating a structure relating to an EGR gas passage.

The structure for the countermeasure against condensed water in the gas merging portion "A" can be changed. Specifically, the following structure can be employed, as a structure for maintaining the EGR gas flowing into the gas merging portion "A" at a high temperature state. As illustrated in FIG. 6, an EGR pipe 36 is provided with a bypass pipe 81 which circumvents the EGR cooler 38, and a control valve 82 at a portion where the bypass pipe 81 branches out from the EGR pipe 36. In this case, the proportion between the EGR gas passing through the EGR cooler 38 and the EGR gas passing through the bypass pipe 81 is controlled through the control valve 82. That is, the proportion between the low-temperature EGR gas and the high-temperature EGR gas is controlled.

Figure 7:
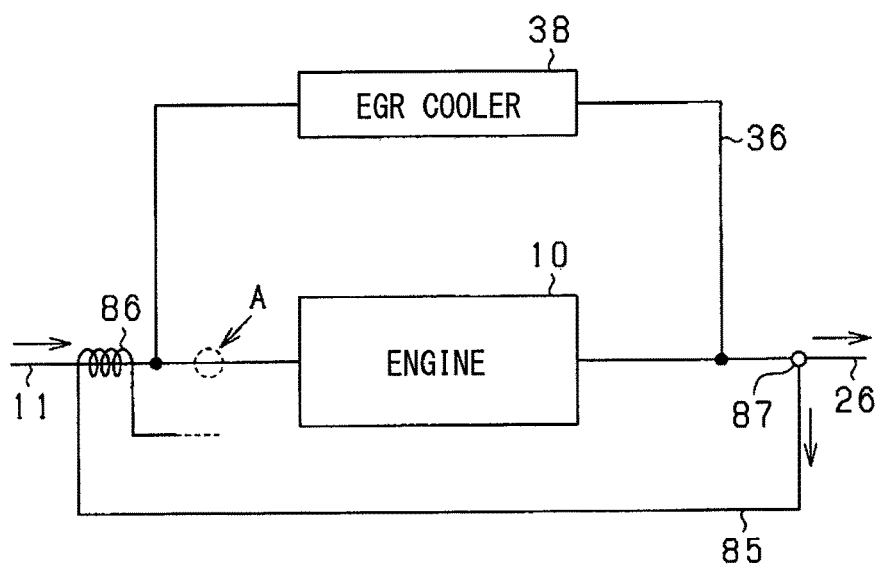
FIG. 7 is a view schematically illustrating a structure relating to an EGR gas passage.

The temperature adjustment portion for raising the temperature of the fresh air upstream of the gas merging portion "A" can raise the fresh air temperature through heat of the exhaust gas. In this case, as illustrated in FIG. 7, a branch pipe 85 is provided in such a way as to branch out from the exhaust duct 26 and, also, a heating device 86 for heating the fresh air through heat of the exhaust gas is provided in the branch pipe 85. The heating device 86 heats the fresh air through heat of the exhaust gas, upstream of the gas merging portion "A". It is preferable that a control valve 87 which can be controlled by the ECU 50 is disposed at the point where the branch pipe 85 branches out from the exhaust duct 26. Also, an electric heater can be disposed in the intake duct 11 upstream of the gas merging portion "A", in order to raise the temperature of the fresh air through the electric heater.

The structure for a countermeasure against condensed water in the intercooler 34 can be changed. Specifically, a temperature adjustment device can be used in order to reduce the degree of cooling the intake air by the intercooler 34. For example, by controlling a flow rate control valve (e.g., the thermostat 73) or the water pump 71 disposed in the I/C coolant passage L2, the flow rate of the coolant flowing into the intercooler 34 is reduced, thereby reducing the degree of cooling the intake air by the intercooler 34. Also, a part of the engine coolant flowing through the engine coolant passage L1 can be flowed into the I/C coolant passage L2, in order to reduce the degree of cooling the intake air by the intercooler 34.

Referring to FIG. 4, with regard to the secondary countermeasure for restricting the generation of condensed water in the gas merging portion "A", and the secondary countermeasure for restricting the generation of condensed water in the intercooler 34, only one of them may be performed while the other may not be performed, or both of them may not be performed.

It is considered that causes of generation of condensed water in the EGR gas passage include heat dissipation from the EGR pipe 36 and the intake duct 11 through their pipe walls. As a countermeasure against the above causes, it is possible to heat the EGR pipe 36 and the intake duct 11, in cases where there is concern about the generation of condensed water due to the heat dissipation from the EGR pipe 36 and the intake duct 11. More specifically, it is possible to properly provide the intake duct heating device 67 illustrated in FIG. 2 and the heating device illustrated in FIG. 7 at required positions in the EGR pipe 36 and the intake duct 11, in order to heat the EGR pipe 36 and the intake duct 11 substantially in their entirety, by these heating devices 67 and 86.

As an external EGR system, it is also possible to employ an EGR system of a high pressure loop (HPL) type. In this EGR system, an EGR pipe is provided in such a way as to connect a portion of the exhaust duct 26 upstream of the exhaust gas turbine 32 to a portion of the intake duct 11 downstream of the intake air compressor 31. In this case, it is preferable to perform determinations of generation of condensed water and countermeasures for restricting the generation of condensed water, similarly to in the aforementioned description.

As a supercharging device, it is also possible to employ other structures than turbochargers. For example, it is possible to employ a so-called supercharger which is operated by power from an output shaft of the engine 10 or power from a motor.

The present disclosure can be also applied to internal combustion engines other than gasoline engines and can be applied to diesel engines, for example.

Although the present disclosure has been described with reference to the embodiments, it is understood that the present disclosure is not limited to these embodiments and structures. The present disclosure is intended to encompass various modification examples and modifications falling within equivalents thereof. In addition, various combinations and forms, and other combinations and forms which include an additional one or more or less component are also included in the scope and sprit of the present disclosure.

What is claimed is:

1. An EGR system for an internal combustion engine, comprising:
   a supercharging device configured to supply an intake air to be introduced into an internal combustion engine;
   an intercooler disposed downstream of an intake air compressing portion in the supercharging device, in an intake path in the internal combustion chamber, and configured to cool the intake air;
   an EGR pipe configured to recirculate a part of exhaust gas discharged from the internal combustion engine, as an EGR gas, to the intake path from an exhaust path;
   an EGR valve disposed in the EGR pipe;
   an EGR cooler disposed in the EGR pipe; and
   a controller including:
     a determination portion configured to determine whether the condensed water is generated in the intercooler due to cooling of a mixed gas of the EGR gas and the intake air which is raised in temperature due to a pressure rise along with a supercharging by the supercharging device, based on an I/C gas temperature and determine whether the condensed water is generated in the EGR cooler based on an EGR gas temperature;
     a first condensed-water-restricting portion configured to control a temperature of an I/C coolant flowing into the intercooler in order to adjust a temperature of the mixed gas in the intercooler in such a manner as to restrict a generation of the condensed water in the intercooler based on a first determination result of the determination portion that the condensed water is generated in the intercooler; and a second-condensed-water-restricting-portion configured to reduce the EGR gas amount in such a manner as to restrict a generation of the condensed water in the EGR cooler, based on a second determination result of the determination portion that the condensed water is generated in the EGR cooler.

2. The EGR system for an internal combustion engine according to claim 1, wherein
the intercooler causes the I/C coolant to flow therethrough and cools the intake air through a heat exchange between the I/C coolant and the intake air;
the I/C coolant flows through a different circulation passage from a circulation passage through which the engine coolant for cooling the internal combustion engine circulates, and is maintained at a lower temperature than that of the engine coolant; and
the first condensed-water-restricting portion raises, in temperature, the I/C coolant flowing into the intercooler, within a range which prevents a temperature of the I/C coolant from being higher than that of the engine coolant, or reduces an amount of the coolant flowing into the intercooler, as a countermeasure against the condensed water in the intercooler.

3. The EGR system for an internal combustion engine according to claim 1, wherein the controller further comprises:
a redetermination portion determining again whether the condensed water is generated in the intercooler under a condition where the condensed-water-restricting portion performs the countermeasure against the condensed water in the intercooler; and
a countermeasure portion configured to perform an EGR reducing processing of reducing the EGR gas passing through the EGR valve in amount, when the redetermination portion determines that the condensed water is generated in the intercooler.

4. The EGR system for an internal combustion engine according to claim 1, wherein
the first condensed-water-restricting portion is configured to restrict the generation of condensed water in the intercooler on the determination that condensed water is generated in the intercooler, without restricting the generation of condensed water in the EGR cooler; and
the second condensed-water-restricting portion is configured to restrict the generation of condensed water in the EGR cooler on the determination that condensed water is generated in the EGR cooler, without restricting the generation of condensed water in the intercooler.

5. The EGR system for an internal combustion engine according to claim 1, wherein
the first condensed-water-restricting portion is configured to control the temperature of the I/C coolant flowing into the intercooler in order to adjust the temperature of the mixed gas in the intercooler to restrict the generation of the condensed water in the intercooler by controlling a flow rate control valve to adjust a flow rate of the I/C coolant.

6. The EGR system for an internal combustion engine according to claim 1, wherein
the first condensed-water-restricting portion is configured to control the temperature of the I/C coolant flowing into the intercooler in order to adjust a temperature of the mixed gas in the intercooler to restrict the generation of the condensed water in the intercooler by controlling a flow rate control valve to adjust a flow rate of the I/C coolant passing through a heat exchanger disposed upstream of the EGR cooler.

7. The EGR system for an internal combustion engine according to claim 1, wherein
the determination portion is further configured to determine whether the condensed water is generated in a merging portion of the intake path at which a fresh air and the EGR gas merge with each other;
the EGR system further comprises a third condensed-water-restricting portion configured to restrict a flow rate of an engine coolant for the EGR cooler in such a manner as to restrict a generation of the condensed water in the intercooler based on a third determination result of the determination portion that the condensed water is generated in the merging portion.

8. The EGR system for an internal combustion engine according to claim 1, wherein:
the first condensed-water-restricting portion is further configured to reduce an EGR rate in such a manner as to further restrict the generation of the condensed water in the intercooler after the first condensed-water-restricting portion has controlled the temperature of an I/C coolant flowing into the intercooler in order to adjust the temperature of the mixed gas in the intercooler to restrict the generation of the condensed water in the intercooler.

* * * * *